US008666809B2

(12) United States Patent
Martel et al.

(10) Patent No.: US 8,666,809 B2
(45) Date of Patent: Mar. 4, 2014

(54) ADVERTISEMENT CAMPAIGN SIMULATOR (75) Inventors: Mark Martel, Mountain View, CA (US);
Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 661 days.

(21) Appl. No.: 11/864,633

(22) Filed: Sep. 28, 2007

(65) Prior Publication Data
US 2008/0082400 A1 Apr. 3, 2008

Related U.S. Application Data (60) Provisional application No. 60/827,680, filed on Sep. 29, 2006.

(51) Int. Cl.
*G06Q 30/00* (2012.01)
(52) U.S. Cl.
USPC .................................................. 705/14.41
(58) Field of Classification Search
None
See application file for complete search history.

(56) References Cited

U.S. PATENT DOCUMENTS

| | | | | |
|---|---|---|---|---|
| 2002/0103698 A1* | 8/2002 | Cantrell | ........................ | 705/14 |
| 2002/0194062 A1* | 12/2002 | Linde | .............................. | 705/14 |
| 2003/0046161 A1* | 3/2003 | Kamangar et al. | .............. | 705/14 |
| 2004/0044571 A1* | 3/2004 | Bronnimann et al. | .......... | 705/14 |
| 2006/0173744 A1* | 8/2006 | Kandasamy et al. | ........... | 705/14 |

OTHER PUBLICATIONS

European Patent Office; International Search Report and Written Opinion for PCT Application Serial No. PCT/US/2007/ 079998, dated Mar. 11, 2008, 15 pages.

* cited by examiner

*Primary Examiner* — Daniel Sorkowitz
(74) *Attorney, Agent, or Firm* — Fish & Richardson P.C.

(57) ABSTRACT

A shadow ad can be evaluated by receiving an ad request, identifying at least one shadow ad and at least one actual ad based on the received ad request, generating an ad ranking by analyzing one or more criteria associated with the identified at least one shadow ad and the at least one actual ad, and selecting one or more of the identified at least one shadow ad and the at least one actual ad based on the ad ranking. Further, the at least one shadow ad can be associated with one or more campaign parameters corresponding to a shadow ad campaign. Additionally, the ad request can be received from an online advertising system.

22 Claims, 6 Drawing Sheets

FIG. 1

Ad Group: Arthritis
Active — Pause Ad Group | Delete Ad Group

| Keyword | Status | Current Bid Max CPC | Clicks ▼ | Impr. | CTR | Avg. CPC | Cost | Avg. Pos |
|---|---|---|---|---|---|---|---|---|
| rheumatoid | | $0.05 | | | | | | |
| osteoarthritis | | $0.05 | | | | | | |
| arthritis relief | | $0.03 | | | | | | |
| arthritis pain | | $0.04 | | | | | | |
| arthritis drug | | $0.05 | | | | | | |
| joint pain | | $0.02 | | | | | | |
| Total | | | | | | | | |

ADVERTISEMENT CAMPAIGN SIMULATOR

CROSS REFERENCE TO RELATED APPLICATION

This application claims the benefit of the filing date of U.S. Provisional Application Ser. No. 60/827,680, filed on Sep. 29, 2006, and entitled "Advertisement Campaign Simulator", the entire disclosure of which is incorporated herein by reference.

BACKGROUND

The present disclosure relates to advertising in an online environment and to simulating an online advertising campaign. The present disclosure further relates to conducting an advertising auction based on a shadow advertising campaign and one or more actual advertising campaigns, and to strategies for evaluating the performance of a shadow advertising campaign based on one or more actual advertising campaigns.

Internet advertising has increased significantly with the expanding commercialization of the World-Wide-Web. Advertising on the Internet began, at least in part, with advertisements (or "ads") that were featured as content on advertisers' home pages. As with conventional media, an Internet ad campaign can comprise one or more ads that are displayed through one or more outlets, such as web sites or individual web pages.

An ad can serve one or more intended purposes, including commercial, charitable, educational, and entertainment purposes. Additionally, an online ad can exist in a variety of forms, such as text, video, audio, image, or any combination thereof. Each display of an ad to a user is referred to as an impression (or an "exposure"). Typically, an impression is generated when a web page including the ad is displayed in a web browser window of a user device. An ad also can be configured to include embedded code, such as a hyperlink, that allows a user to "click-through" the ad. Clicking-through an ad can activate a function, such as redirecting the browser to a different web page or displaying an additional window. For example, a new window can be opened to provide information describing a product or service described in the ad to a user. A new window also can be opened to allow the user to initiate a purchase transaction.

The effectiveness of an ad can be measured in various ways. For example, the click-through rate (CTR) of an ad can be determined to identify how frequently the ad is accessed when it is presented. The CTR of an ad can be calculated by dividing the number of click-throughs associated with the ad by the number of impressions of that ad over a given time period. The number of conversions associated with an ad also can be used as a measure of effectiveness. A conversion can be any desired action taken in response to the ad, including a sale, a download, a contact, a request, or an entry into a database. As with the CTR, the conversion rate can be determined by dividing the number of conversions attributed to an ad by the number of impressions of that ad over a given time period.

The presentation and placement of ads on web pages has evolved along with other Internet content. Ads now typically occupy the periphery of web pages or are integrated with other content in the body of a web page. For example, banner ads, expandable banner ads, tile ads, and skyscraper ads each can be mixed with additional content comprising a web page. Ads also can be displayed in separate browser windows, which are referred to as pop-up or pop-under windows. Further, ads can be integrated with toolbars or presented as temporary objects that are configured to appear and disappear without user intervention.

As with conventional print and broadcast media, a web site can be used to present (or "host") ads associated with one or more third-party advertisers. Further, the hosting web site can receive compensation from the third-party running the ad, including payment and reciprocal advertising. Additionally, a web site can demand higher payment for the presentation of an ad as the amount of traffic on that web site increases. As with conventional media, the increased traffic can provide greater exposure for the ad, which in turn can generate a higher number of conversions or click-throughs even if the CTR or conversion rate is lower than that of a less popular site.

Search engines were among the first content providers to successfully sell Internet space to third-party advertisers. Further, some search engine providers created advertising systems that are able to match advertisements with available advertising space, both on the search engine's web pages and web pages associated with other content providers. A search engine advertising system also can be configured to conduct an automated, real-time auction to select one or more ads for display in response to input received from a user. Additionally, a search engine advertising system can be further configured to automatically insert one or more ads into content comprising a particular web page. For example, an ad can be inserted into a predetermined area of a static or dynamically-generated web page. Further, an advertising system can select and order ads that are to be inserted into a web page in accordance with a wide range of criteria associated with the ads. The criteria used to select and order ads can include one or more bids submitted by an advertiser, a CTR, a conversion rate, a geographical preference, and a language preference.

Additionally, an advertising system can be configured to permit multiple advertisers to compete for the same advertising space. For example, a search engine can display one or more ads in response to a keyword or keyword combination received from a user. If two or more advertisers desire to have their ads displayed in response to a specific keyword or keyword combination, each advertiser can specify a bid corresponding to their ad. An advertising system can be configured to select one or more ads for display in response to input from a user comprising one or more keywords. Further, the advertising system can be configured to determine the display order of the selected ads in accordance with one or more factors, including the corresponding bids.

Advertisers, however, can be reluctant to allocate a portion of an advertising budget to Internet advertising without some assurance regarding performance. An advertiser thus can be reluctant to specify a corresponding bid that will be competitive in an auction. Therefore, a variety of ways to gauge the effectiveness of an Internet ad have been developed. For example, some advertisers have launched one or more test ads. A test ad can be representative of a larger advertising campaign comprising one or more related ads. Further, the test ad can be restricted with respect to one or more parameters, including the number of associated keywords, the allocated budget, and the length of time over which the ad is run. Additionally, the scope of the test ad can be limited, such as to a single web site, to users in a particular geographic region, or even with respect to the time of day and day of the week on which the ad is run. Data associated with the test ad can be analyzed to determine whether an expanded campaign should be launched or whether one or more refinements to the ad campaign should be implemented.

The success of an ad campaign also can be projected using historical data. For example, the number of requests comprising a particular keyword or keyword combination that will be received during a future period can be estimated using search requests received during a preceding period of time. The CTR and/or conversion rate of an ad can be similarly estimated using performance data associated with related ads that have been previously run. Additionally, an initial bid amount can be established in accordance with historical bidding levels. If data from a sufficient period is available, one or more campaign settings also can be adjusted based on a trend analysis.

Additionally, the success of an ad campaign can be modeled, such as through a modeling application. For example, historical data relating to similar ad campaigns can be manipulated based on one or more assumptions about the future. In order to generate projected results for an ad, one or more parameters associated with the ad can be entered into the modeling application. The projected results produced by the model then can be used to determine whether the ad or an associated ad campaign should be implemented.

SUMMARY

The present inventors recognized the need to provide an improved system and method for generating results corresponding to the performance of a proposed advertising campaign conducted in an online environment. Further, the need was recognized to use one or more actual advertising campaigns to assess the performance of a proposed advertising campaign. Additionally, the present inventors recognized the need to determine the results, such as the number of impressions, clicks and conversions, a proposed advertising campaign would have generated in an advertising network if it had been implemented in accordance with one or more parameters.

The present inventors also recognized the need to identify one or more sites on which an ad associated with a proposed advertising campaign would have been displayed. Further, the present inventors recognized the need to identify search results in response to which an ad associated with a proposed advertising campaign would have been presented. Additionally, the need was recognized to permit an advertiser to evaluate the performance of a proposed advertising campaign in response to two or more sets of differing parameters.

The present inventors also recognized the need to automate the generation of results corresponding to the performance of a proposed advertising campaign. Further, the need was recognized to generate results corresponding to the performance of a proposed advertising campaign in real-time or in near real-time. Additionally, the present inventors recognized the need to permit an ad network or an ad server to evaluate the performance of one or more advertising strategies, including newly developed advertising strategies. Accordingly, the techniques and apparatus described here implement algorithms for generating results corresponding to the performance of a proposed advertising campaign and for evaluating the results associated with a plurality of proposed and actual advertising campaigns.

In general, in one aspect, the subject matter can be implemented to include receiving an ad request; identifying at least one shadow ad and at least one actual ad based on the received ad request; generating an ad ranking by analyzing one or more criteria associated with the identified at least one shadow ad and the at least one actual ad; and selecting one or more of the identified at least one shadow ad and the at least one actual ad based on the ad ranking.

The subject matter also can be implemented such that the at least one shadow ad is associated with one or more campaign parameters corresponding to a shadow ad campaign. Further, the subject matter can be implemented such that identifying at least one shadow ad and at least one actual ad further comprises comparing the one or more campaign parameters associated with the at least one shadow ad with one or more criteria included in the ad request to determine a match. Additionally, the subject matter can be implemented such that the one or more criteria associated with the identified at least one shadow ad and the at least one actual ad include a performance factor.

The subject matter also can be implemented to include updating an ad campaign database in accordance with the one or more selected shadow ads. Further, the subject matter can be implemented to include recording a charge corresponding to the one or more selected shadow ads. Additionally, the subject matter can be implemented such that the ad request is received from an online advertising system.

In general, in another aspect, the subject matter can be implemented as a computer program product, encoded on a computer-readable medium, operable to cause data processing apparatus to perform operations comprising receiving an ad request; identifying at least one shadow ad and at least one actual ad based on the received ad request; generating an ad ranking by analyzing one or more criteria associated with the identified at least one shadow ad and the at least one actual ad; and selecting one or more of the identified at least one shadow ad and the at least one actual ad based on the ad ranking.

The subject matter also can be implemented such that the at least one shadow ad is associated with one or more campaign parameters corresponding to a shadow ad campaign. Further, the subject matter can be implemented such that identifying at least one shadow ad and at least one actual ad further comprises comparing the one or more campaign parameters associated with the at least one shadow ad with one or more criteria included in the ad request to determine a match. Additionally, the subject matter can be implemented such that the one or more criteria associated with the identified at least one shadow ad and the at least one actual ad include a performance factor.

The subject matter also can be implemented to be further operable to cause data processing apparatus to perform operations comprising updating an ad campaign database in accordance with the one or more selected shadow ads. Further, the subject matter can be implemented to be further operable to cause data processing apparatus to perform operations comprising recording a charge corresponding to the one or more selected shadow ads. Additionally, the subject matter can be implemented such that the ad request is received from an online advertising system.

In general, in another aspect, the subject matter can be implemented as a system comprising an ad database storing at least one shadow ad and at least one actual ad and a shadow ad server configured to perform operations comprising receiving an ad request; identifying in the ad database at least one shadow ad and at least one actual ad based on the received ad request; generating an ad ranking by analyzing one or more criteria associated with the identified at least one shadow ad and the at least one actual ad; and selecting one or more of the identified at least one shadow ad and the at least one actual ad based on the ad ranking.

The subject matter also can be implemented such that the ad database further stores one or more campaign parameters associated with the at least one shadow ad. Further, the subject matter can be implemented such that the operations comprising identifying at least one shadow ad and at least one actual ad further comprise comparing the one or more campaign parameters associated with the at least one shadow ad with one or more criteria included in the ad request to determine a match. Additionally, the subject matter can be implemented such that the one or more criteria associated with the identified at least one shadow ad and the at least one actual ad include a performance factor.

The subject matter also can be implemented such that the shadow ad server is further configured to perform operations comprising updating an ad campaign database in accordance with the one or more selected shadow ads. Further, the subject matter can be implemented such that the shadow ad server is further configured to perform operations comprising recording a charge corresponding to the one or more selected shadow ads. Additionally, the subject matter can be implemented such that the shadow ad server is further configured to perform operations comprising receiving the ad request from an online advertising system.

The techniques described in this document can be implemented to realize one or more of the following advantages. For example, the techniques can be implemented to identify the actual results a proposed advertising campaign would have generated if it had been active during a particular time period. The results corresponding to the proposed advertising campaign also can be compared with one or more actual advertising campaigns that were active for the same time period. Further, the techniques can be implemented to assess the effectiveness of one or more parameters associated with a proposed advertising campaign. The techniques also can be implemented to permit an ad server or an ad network to demonstrate the effectiveness of an advertising system to an advertiser or a potential advertiser. Additionally, the techniques can be implemented to permit an advertiser to identify search results with which an ad would have been displayed or one or more web sites on which an ad would have appeared.

Further, the techniques can be implemented to permit an advertiser to generate results corresponding to a full advertising campaign instead of a sample or representative campaign. The techniques also can be implemented such that results associated with a proposed advertising campaign can be automatically generated in real-time or near real-time. Further, the techniques can be implemented such that results associated with a proposed advertising campaign can be generated based on one or more actual advertising campaigns. Additionally, the techniques can be implemented to reduce one or more aspects of the human cost associated with assessing the effectiveness of a proposed advertising campaign.

These general and specific techniques can be implemented using an apparatus, a method, a system, or any combination of an apparatus, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
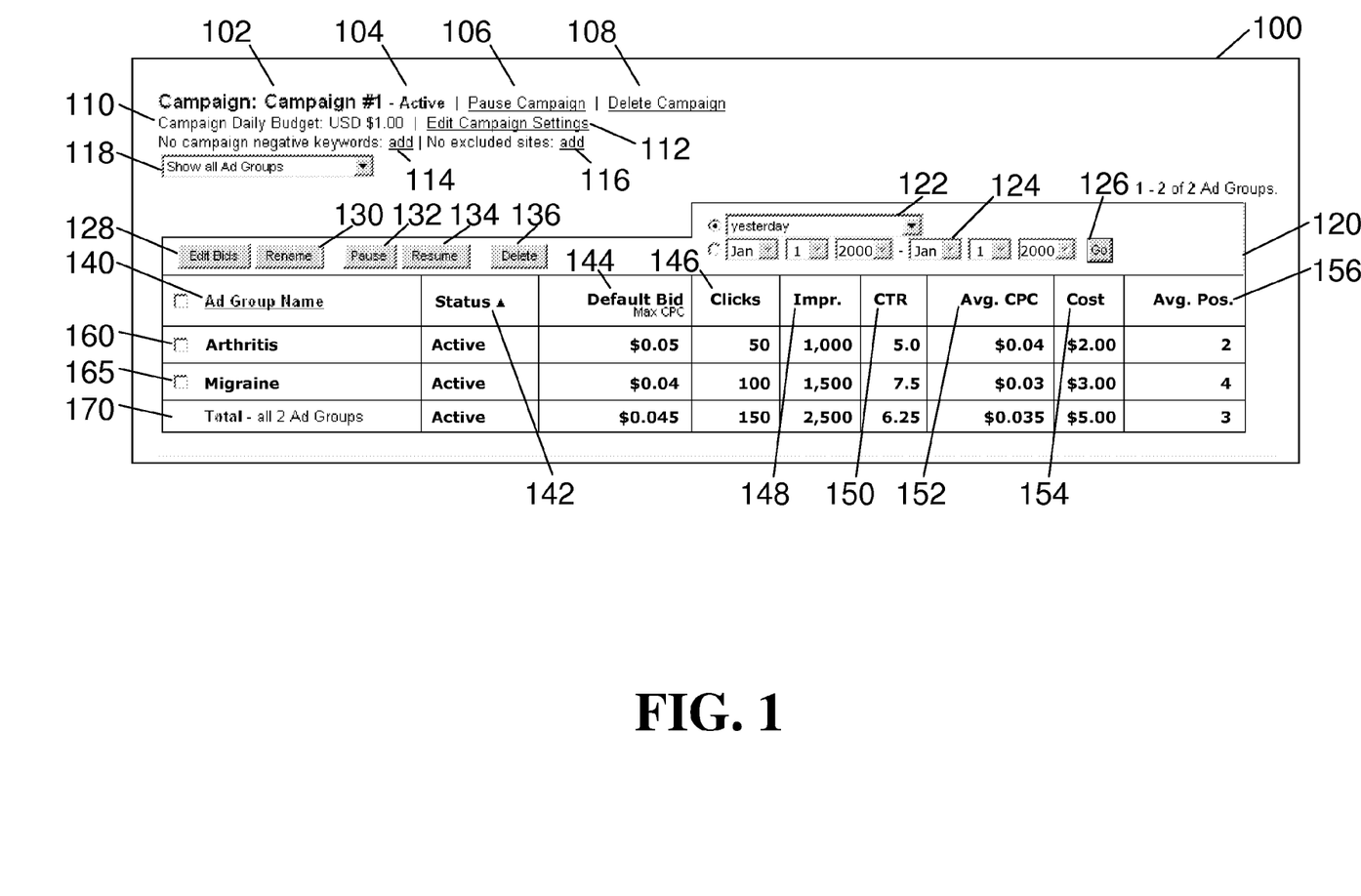
FIG. 1 depicts a user interface presenting information associated with an advertising campaign.

FIG. 1 presents a user interface 100 configured to display information associated with an advertising campaign comprising one or more ad groups. The advertising campaign can be an actual campaign in which one or more advertisements are presented to public users. For example, an advertisement associated with the actual ad campaign can be displayed in conjunction with search results presented in response to a search request. An advertisement also can be displayed along with other content on a third-party web page. Alternatively, the advertising campaign can be a shadow campaign that can be used to test the performance of one or more parameters associated with the ad campaign. The one or more advertisements comprising a shadow campaign do not compete for presentation space and position with advertisements of one or more actual campaigns. The one or more advertisements of a shadow campaign also are not displayed (or "served") to public users.

The user interface 100 includes a campaign name 102 that identifies the ad campaign and a campaign status identifier 104 that indicates the current status of that ad campaign. For example, the campaign name 102 is Campaign #1 and the campaign status identifier 104 indicates that Campaign #1 is currently Active. Therefore, an ad corresponding to an ad group included in Campaign #1 can be selected and displayed, and a cost to the advertiser sponsoring Campaign #1 can be incurred.

In an implementation, the status of an ad campaign can be active if the campaign is presently running, paused if the campaign has been temporarily halted, and deleted if the campaign has been permanently disabled. The campaign status identifier 104 also can be configured to include one or more selectable controls to permit a user, such as an advertiser, to change the campaign status. For example, a pause campaign link 106 can be included to permit a user to pause the campaign and a delete campaign link 108 can be included to permit a user to delete the campaign. If the campaign is paused, the pause campaign link 106 can be hidden or deactivated, and an activate campaign link can be displayed to permit a user to activate the paused campaign. The user interface 100 also can be configured to include a campaign budget identifier 110 that indicates the campaign budget for a given period, such as a day, a week, or a month. Further, an edit campaign settings control 112 can be included to permit a user to change one or more parameters associated with the ad campaign.

One or more of the ad groups comprising the ad campaign can be selected for display in the user interface 100 through the ad group menu 118. Information corresponding to each of the selected ad groups can be presented in the ad group summary 120. Further, a period for which information corresponding to the selected ad groups is to be displayed also can be specified. A predetermined period can be selected from the period menu 122, such as a day, a week, a month, or all. Additionally, a custom time period can be specified through the date entry form 124. Once the desired time period for a report has been specified, the user can select the go button 126 to populate the ad group summary 120 with information for that period.

The ad group summary 120 also can include control buttons to permit the user to perform actions associated with one or more of the ad groups comprising the ad campaign. An edit bids button 128 can be selected to modify the bid value associated with one or more ad groups. If a user determines that ads associated with an ad group are not being displayed as frequently or as prominently as desired, the user can increase the value of the bid associated with that ad group. Alternatively, if a user determines that the cost attributable to an ad group are too high, the user can decrease the value of the bid associated with that ad group. A rename button 130 also can be included to permit a user to rename an existing ad group.

As discussed above with respect to an ad campaign, an individual ad group within an ad campaign also can be activated, paused, or deleted. Therefore, the ad group summary 120 can include a plurality of status buttons to permit a user to change the status of an ad group. For example, a pause button 132, a resume button 134, and a delete button 136 can be included in the ad group summary to permit a user to specify a status for a newly created ad group or modify the status of an existing ad group.

The ad group summary 120 includes an ad group name 140 column identifying each ad group listed in the report. Further, the information associated with an ad group is presented as a single row of the ad group summary 120. For example, information associated with the ad group arthritis is presented in a first row 160 and information associated with the ad group migraine is presented in a second row 165. Additionally, the bottom row 170 can be used to present a column total or column average for all of the ad groups included in the ad group summary 120.

A status column 142 can be included in the ad group summary 120 to indicate the status of each ad group, such as active, paused, or deleted. In an implementation, information associated with a deleted ad group can remain accessible to the advertiser. A default bid column 144 indicates the maximum cost-per-click ("CPC") associated with an ad group. The maximum CPC represents the highest amount an advertiser is willing to pay if an advertisement associated with that ad group generates a click-through. Although a bid associated with an impression for an ad group cannot exceed the default bid, the bid can be lower. In an implementation, the default bid can be expressed in different terms, such as the cost-per-thousand impressions ("CPM") instead of CPC.

The ad group summary 120 also can be configured to present information relating to the performance of an ad group. A clicks column 146 indicates the number of clicks that have been generated by an ad group for the time period of the ad group summary 120. Further, an impressions column 148 provides the number of ad impressions for an ad group over the time period of the ad group summary 120. Additionally, the number of clicks can be divided by the number of impressions to determine the CTR, which can be presented in the CTR column 150.

As the bid for an ad group can vary with each impression, an average cost for the ad group over the time period of the ad group summary 120 can be displayed in the average CPC column 152. A cost column 154 also can be provided to indicate the total cost of the ad group over the period of the ad group summary 120. Additionally, an average position column 156 can be included to identify the average display position of the impressions associated with the ad group. By specifying two or more different ad group summary periods, a user can analyze the performance of an ad group over time. Further, a user also can compare the performance of two or more ad groups over identical time periods. If desired, one or more ad group parameters can be modified to influence future ad group performance.

The user interface 100 also can include one or more controls through which negative limitations can be specified for an ad campaign. A negative keyword control 114 can be included to permit a user to specify one or more negative keywords for an ad campaign. Once specified, none of the advertisements included in the ad campaign will be selected in response to criteria that contains a negative keyword. An excluded site control 116 also can be included to permit a user to specify one or more sites on which an advertisement of the ad campaign shall not be presented. An advertiser can thus elect not to permit the advertisements of an ad campaign to be displayed on a site that conflicts with the advertiser's goals or that could harm the advertiser's image, such as the site of a competitor or a site containing objectionable material. For example, an advertiser can specify that an ad campaign directed to a family restaurant is not to appear on a particular site featuring adult-oriented content. In an implementation, one or more of a customer language, an advertising location or geographic region, a currency, and a daily budget also can be defined for an ad campaign.

Figure 2:
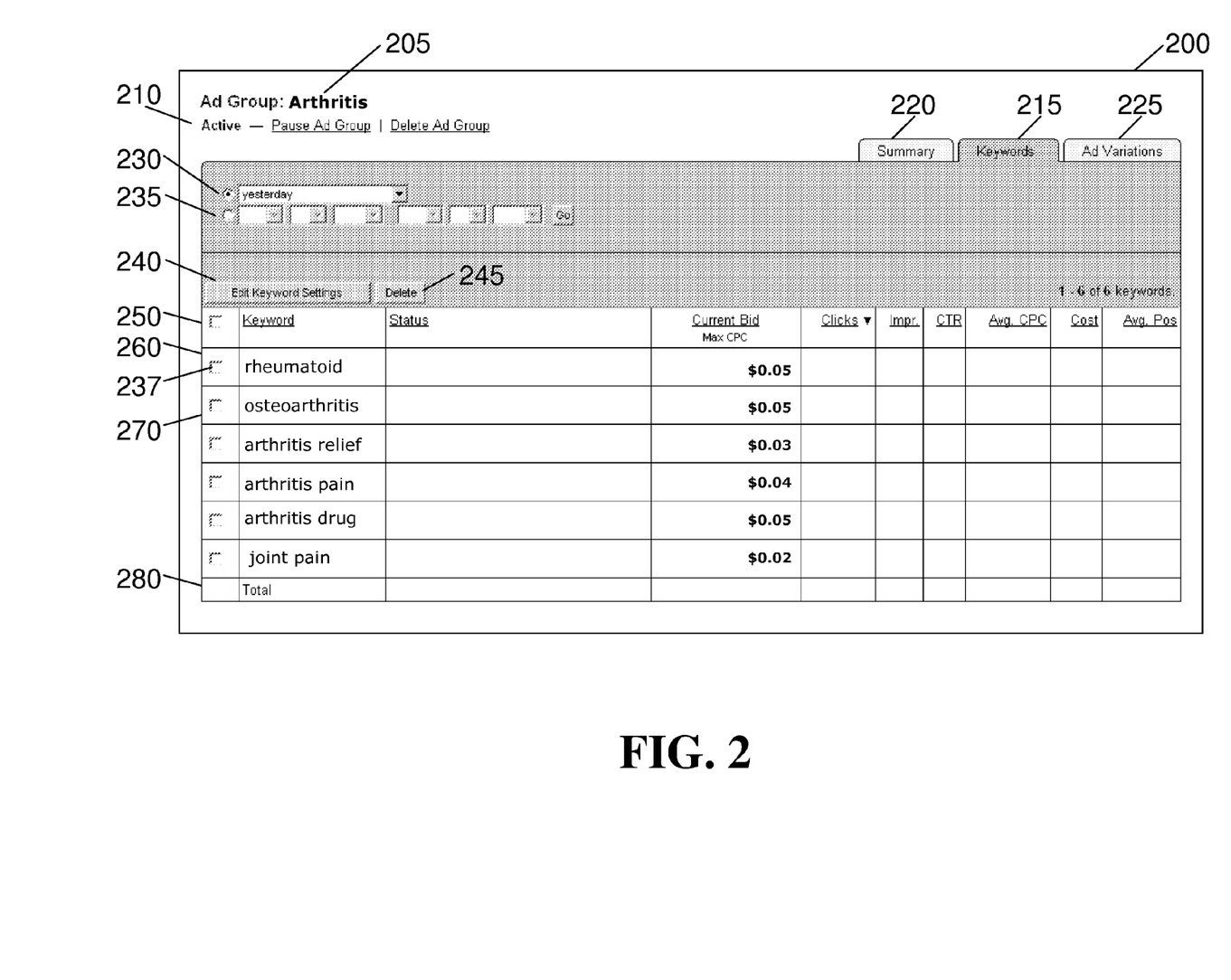
FIG. 2 depicts a user interface presenting information associated with an ad group.

FIG. 2 presents a user interface 200 configured to display information associated with an ad group of an advertising campaign, such as the advertising campaign described with respect to FIG. 1. An ad group is comprised of one or more advertisements and one or more associated parameters. The parameters can be used by an advertising system to select and present one or more advertisements to public users. In an implementation, if an ad campaign is a shadow campaign, the one or more advertisements associated with an ad group can be notional or placeholder ads.

The user interface 200 includes an ad group identifier 205 that indicates the name of the ad group, such as Arthritis. The user interface 200 also can include an ad group status identifier 210 that indicates the current status of the ad group, such as active, paused, or deleted. The ad group status identifier 210 also can include one or more status controls to permit a user to change the status. For example, if the ad group status is active, status controls can be provided to change the ad group status to paused or deleted.

The user interface 200 also can include a plurality of tabs that provide information relating to the ad group and allow a user to modify one or more parameters associated with the ad group. For example, the user interface 200 can include a keyword tab 215 that describes the performance of one or more keywords corresponding to the ad group, a summary tab 220 that describes ad group performance on one or more ad networks, and an ad variations tab 225 that describes the one or more ads comprising the ad group.

The information presented in a tab, such as the keyword tab 215, can be restricted to a particular date or date range. Thus, the user interface 200 includes a date range menu 230 that provides predetermine options, such as a day, a week, a month, or all. Further, the user interface 200 also includes a date entry form 235 through which a user can specify a custom period.

The user interface 200 also can include one or more controls to permit a user to modify a keyword associated with the ad group. A checkbox corresponding to a particular keyword, such as the checkbox 237 corresponding to the keyword rheumatoid, can be selected to modified that keyword. For example, the user interface 200 can include an edit keyword settings button 240. In response to a user selecting the edit keyword settings button 240, the user interface 200 can display one or more settings associated with the one or more selected keywords such that those settings can be edited by a user. The user interface 200 also can include a delete button 245 that can be used to delete the one or more selected keywords.

The keyword tab 215 can be configured to present the information associated with the ad group keywords in a table or spreadsheet format. Thus, a first row 250 can identify the category of information presented in each column. Further, the information associated with a particular keyword is presented as a single row in the keywords tab 215. For example, information associated with the keyword rheumatoid is presented in a first row 260 and information associated with the keyword osteoarthritis is presented in a second row 270. Additionally, the bottom row 280 can be used to present a column total or column average for all of the keywords included in the keyword tab 215.

Figure 3:
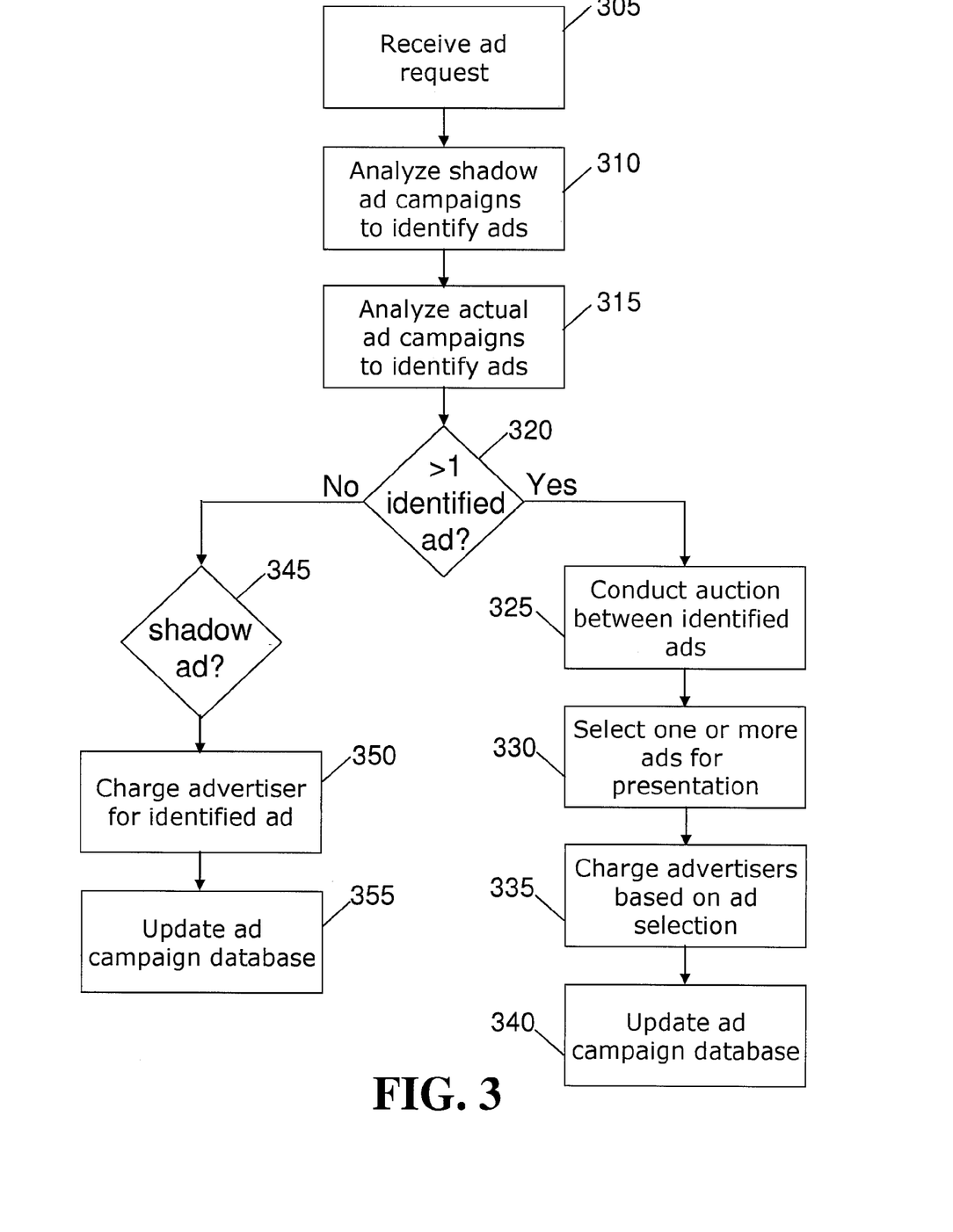
FIG. 3 presents a method of evaluating the effectiveness of one or more shadow ad campaigns.

FIG. 3 presents a method of evaluating the effectiveness of one or more shadow ad campaigns. A shadow ad campaign includes one or more shadow ads. In an implementation, a shadow ad can comprise a proposed ad that has not been previously used, an actual ad that has been used in an actual ad campaign, or a notional ad, such as a placeholder. Each shadow ad campaign also can include one or more campaign parameters that can be used to determine selection and placement of the shadow ads in response to an ad request, including a default bid, one or more negative keywords, and one or more excluded sites.

An ad request is received by the advertising system (305). The ad request can be an actual request submitted by a public user or a web server hosting one or more actual web pages. For example, a public user can submit an actual request by entering search criteria comprising one or more keywords into a search engine. Similarly, a web server can receive a request for a web page and can generate an actual ad request in the process of serving that page. Alternatively, an ad request can be a simulated request that is generated by or provided to the advertising system. For example, one or more ad requests can be simulated based on an anticipated response to a future event. In an implementation, actual and simulated requests also can be filtered in accordance with one or more predetermined criteria to limit the ad requests processed by the advertising system.

One or more shadow ad campaigns can be analyzed to identify ads that correspond to the received ad request (310). The shadow ad campaigns can be analyzed using criteria included in the ad request and one or more ad campaign parameters. For example, one or more keywords included in the ad request can be compared with one or more keywords associated with a shadow ad campaign to determine whether the shadow ad campaign matches the ad request. Further, each of the keywords included in the ad request can be compared with one or more negative keywords associated with a shadow ad campaign, and a resulting match can be used to determine that the shadow ad campaign does not correspond to the received ad request. Additionally, the site on which the ads are to be presented can be compared with one or more excluded sites associated with a shadow ad campaign to ensure that an ad will not be selected for presentation on an excluded site. As with the shadow ad campaigns, one or more actual ad campaigns also can be analyzed to identify ads that correspond to the received ad request (315). Further, the one or more actual ad campaigns also can be evaluated to ensure that an actual ad campaign is not identified as corresponding to an ad request that is associated with a negative keyword or an excluded site.

After the shadow ad campaigns and the actual ad campaigns have been analyzed, the number of identified ads can be determined (320). If more than one ad has been identified, an auction can be conducted between the identified shadow ads and actual ads (325). The Ad Selection and Ad Ordering components of the Google™ AdWords system is an example of an advertising system auction. During the auction, the identified ads are ranked in accordance with one or more ad campaign parameters, such as a default bid and a daily budget. Because the ad campaigns and associated ads are used only to evaluate one or more shadow ad campaigns, ads are not presented to public users. Therefore, the shadow ads and the actual ads can be treated equally in the auction. In an implementation, one or more additional factors also can be considered in conducting the auction. For example, the CTR and/or conversion rate of an ad can be used as an auction factor. Further, an auction factor can be weighted to increase or decrease the impact that factor has on the ranking. An ad that has a higher CTR can thus be ranked above an ad that has a lower CTR, even if the ad with the lower CTR has an equal or greater default bid.

One or more of the identified ads further can be selected for presentation (330). The identified ads can be selected based on the ranking determined during the auction. For example, if the identified ads are to be included in a web page that has space to display four ads, the four highest ranked ads can be selected for presentation. Further, the ranking established during the auction can be used to determine a display order. Therefore, the highest ranked ad can be assigned to the most prominent display position. In an implementation, the display order can be used to determine a user action associated with a shadow ad, such as a click-through or a conversion.

The advertiser sponsoring a shadow ad also can be charged based on ad selection (335). For example, if an advertiser is charged on a CPM basis, the shadow ad campaign corresponding to a selected ad can be debited by the bid amount established during the auction. Alternatively, if an advertiser is charged on a CPC basis, the shadow ad campaign corresponding to a selected ad can be debited by the bid amount if the advertising system determines that the ad would have generated a click-through. By debiting a shadow ad campaign for each impression or click-through generated, the actual cost of a shadow campaign can be accurately assessed. Because only the effectiveness of one or more shadow ad campaigns is being evaluated, information associated with participating actual ad campaigns need not be tracked.

Similarly, an ad campaign database can be updated to reflect the current information associated with the shadow ad campaign and ad group corresponding to a shadow ad (340). For example, information describing the number of impressions, the number of clicks, the CTR, the average CPC, the total cost, and the average position for an ad group can be updated. Within an ad group, the same information can be updated for a keyword or a keyword combination that generated the impression. By updating the information associated with a shadow ad campaign, an advertiser can accurately assess the performance of the entire shadow ad campaign as well as one or more associated parameters.

If only one ad has been identified, there is no need to conduct an auction. As only the effectiveness of one or more shadow ad campaigns is being evaluated, the advertising system can determine whether the identified ad is a shadow ad (345). If the identified ad is a shadow ad, the advertiser can be charged the minimum bid for presenting the shadow ad (350). As described above, the ad campaign database also can be updated to reflect the current information associated with the shadow ad campaign and ad group corresponding to the shadow ad (355).

In an implementation, ad requests received by an online advertising system that is serving actual ads to public users can be provided in real-time or near real-time to a shadow advertising system configured to evaluate one or more shadow ad campaigns. Further, user actions detected by the online advertising system, such as click-throughs and conversions, can be utilized to generate projected user actions for the shadow advertising system.

Figure 4:
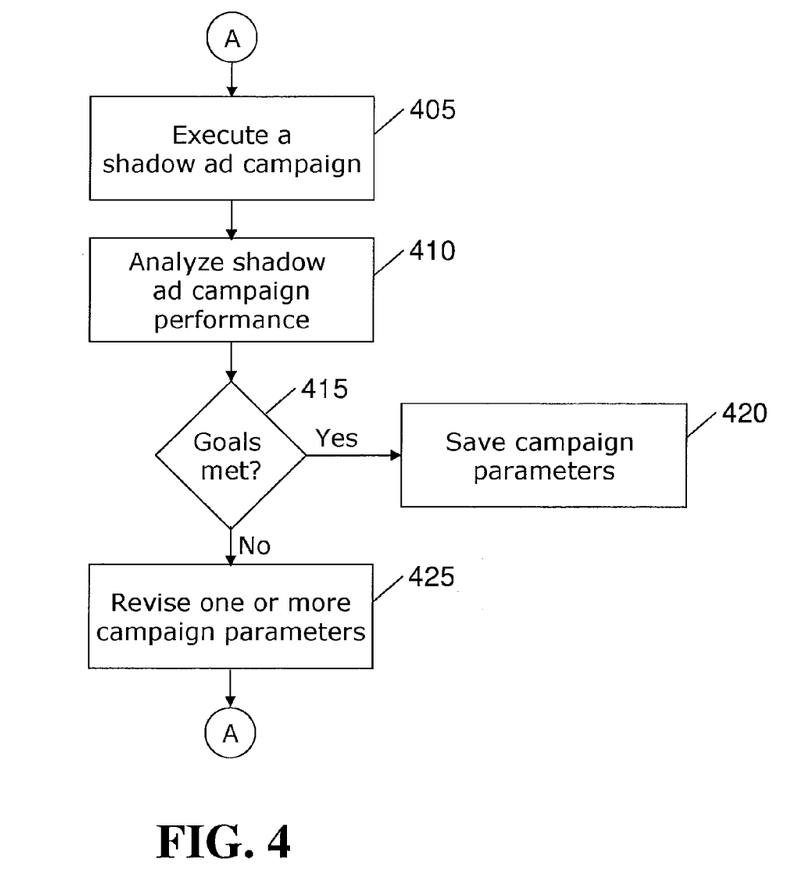
FIG. 4 presents a method of modifying a shadow ad campaign in response to performance in an advertising system.

FIG. 4 presents a method of modifying a shadow ad campaign in response to its performance in an advertising system. A shadow ad campaign can be executed in an advertising system (405). The shadow ad campaign can comprise one or more shadow ads and one or more campaign parameters, including keywords, bids, budgets, and excluded sites. A shadow ad campaign can be a newly devised campaign that has not been previously implemented. Alternatively, a shadow ad campaign can be an existing campaign that has been previously implemented, such as an inactive campaign that an advertiser would like to reintroduce.

An advertising system can be configured to include the shadow ad campaign in a plurality of auctions conducted using one or more other shadow ad campaigns and/or actual ad campaigns. Further, the advertising system can conduct the plurality of auctions as shadow auctions that utilize actual and/or projected ad requests to evaluate the performance of the shadow ad campaign. In another implementation, the advertising system can include the shadow ad campaign in a plurality of actual auctions conducted on an advertising system that serves actual ads in response to received ad requests. If a shadow ad is selected in an actual auction, the shadow ad can be filtered out prior to the presentation of one or more ads to a public user.

The performance of a shadow ad campaign can be analyzed to assess its effectiveness (410). A number of performance factors can be considered, including the number of impressions generated, the number of clicks received, the total cost over the analysis period, the average cost per impression or click, and the average display position of an associated ad. Further, the performance of the shadow ad campaign can be analyzed after a predetermined period of time, such as after an evaluation period has elapsed. The performance of the shadow ad campaign also can be analyzed as desired by an evaluator, such as the advertiser or an advertising system administrator. Additionally, the analysis can be performed manually by the evaluator or automatically, such as by the advertising system.

Once the effectiveness of the shadow ad campaign has been assessed, one or more performance goals can be evaluated (415). For example, an advertiser can desire a minimum CTR or conversion rate for a particular default bid. If the one or more performance goals are met, the campaign parameters associated with the shadow ad campaign can be saved (420). The shadow ad campaign then can be implemented as an actual ad campaign at the direction of the advertiser.

If one or more performance goals associated with the shadow ad campaign are not met, one or more campaign parameters can be revised (425). An evaluator can manually revise a campaign parameter, such as by specifying a new campaign parameter through a user interface. Alternatively, a campaign parameter can be revised automatically in response to a predetermined performance goal. Thus, the advertising system can be configured to attempt to optimize one or more aspects of a shadow ad campaign over time by revising one or more campaign parameters. For example, the advertising system can be configured to identify the lowest default bid that will result in an ad being ranked in the second display position.

Further, one or more feedback loops can be implemented to revise a campaign parameter or a combination of campaign parameters. For example, the number of impressions generated by an ad campaign can be logically coupled to the default bid. If the number of impressions does not satisfy a predetermined minimum value, the default bid can be automatically increased. Similarly, a maximum daily budget and the CTR can be logically coupled to a parameter specifying the time of day during which the shadow ad campaign is to be run. The resulting feedback loop can be utilized to select a daily time period over which the shadow ad campaign generates a sufficiently high CTR for the predetermined budget. Additionally, a feedback loop used to revise a campaign parameter can be stabilized, such as through the use of discrete Bode plots, Nyquist criteria, or nonlinear damping functions.

Figure 5:
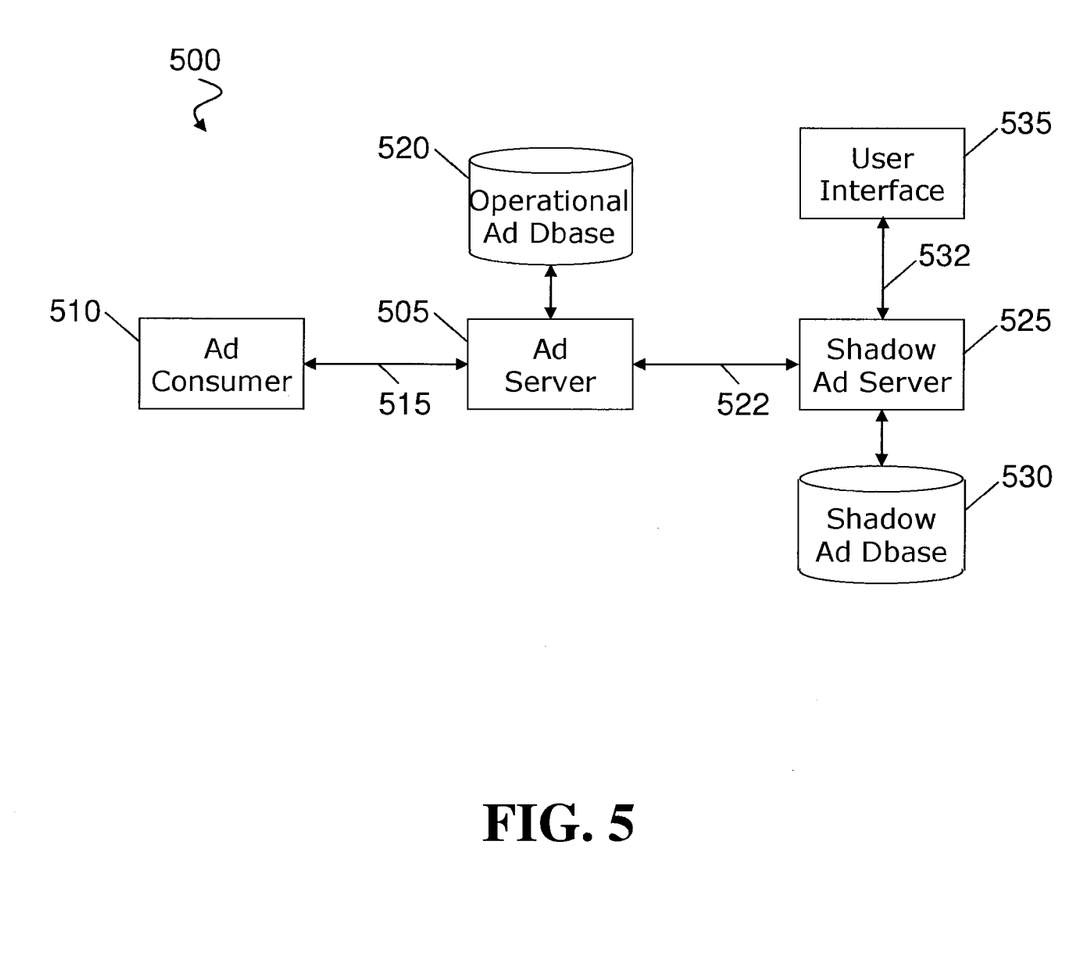
FIG. 5 depicts an advertising system for evaluating a shadow ad campaign.

FIG. 5 depicts an advertising system 500 for evaluating a shadow ad campaign. The advertising system 500 includes an ad server 505 configured to serve one or more ads to an ad consumer 510. The ad server 505 can receive an ad request from the ad consumer 510 over a network connection 515. The ad request can comprise a user defined request, such as one or more search criteria submitted by a user, or an automated request, such as a request to fill advertising space on a web page that is being loaded for display to a user.

Upon receiving an ad request from the ad consumer 510, the ad server 505 can access an operational ad database 520 that is configured to store one or more actual ads intended for presentation to users. Further, one or more actual ads can be associated to form an actual ad campaign. The ad server 505 can be configured to search the actual ads stored in the operational ad database 520 and to identify actual ads that correspond to the ad request. For example, the ad server 505 can identify actual ads associated with one or more keywords included in the ad request. The ad server 505 also can be configured to rank the actual ads that have been identified according to one or more criteria, such as a default bid or a conversion rate. After the ranking has been determined, the ad server 505 can provide one or more actual ads to the ad consumer 510 to satisfy the ad request. For example, if the ad request specified a need for three ads, the three highest ranked actual ads can be transmitted to the ad consumer 510.

The advertising system 500 also can include a shadow ad server 525 that can be configured to conduct shadow auctions and to maintain one or more shadow ad campaigns. Further, the shadow ad server 525 can be configured to communicate with the ad server 505 over a communication channel 522, such as a local area network. The shadow ad server 525 can thus access actual ads stored in the operational ad database 520 and receive ad requests submitted to the ad server 505 by the ad consumer 510.

The shadow ad server 525 can conduct a shadow auction using at least one shadow ad campaign stored in a shadow ad database 530 and one or more actual ad campaigns stored in the operational ad database 520. Further, a shadow auction can be conducted based on an ad request submitted by the ad consumer 510. Alternatively, a shadow auction can be conducted using a simulated ad request. For example, one or more ad requests can be simulated for use by the shadow ad server 525 to produce an advertising environment based on one or more assumptions about the future. In an implementation, a plurality of shadow auctions can be conducted to evaluate the effectiveness of a shadow ad campaign over a period of time using ad requests received from the ad consumer 510 and/or simulated ad requests. In another implementation, a shadow auction can be conducted by the shadow ad server 525 in parallel with an actual auction conducted by the ad server 505 to obtain shadow auction results in real-time or near real-time.

One or more items of information associated with a shadow ad campaign stored in the shadow ad database 530 can be updated to reflect the results of a shadow auction. Further, information associated with one or more shadow ad campaigns can be presented to a user, such as an advertiser, through a user interface 535. The user interface 535 can be provided on the shadow ad server 525. Alternatively, the user interface 535 can comprise a separate computing platform that is coupled to the shadow ad server 525 through a communication channel 532, such as the Internet. Further, one or more items of information associated with a shadow ad campaign stored in the shadow ad database 530, including campaign parameters, can be modified through the user interface 535.

In an implementation, the shadow ad server 525 and the ad server 505 can comprise a single computing platform. Further, the shadow ad database 530 and the operational ad database 520 can be hosted on a single computing platform. Additionally, the shadow ad database 530 and the operational ad database 520 can be combined into a single database structure, such that an actual ad campaign is differentiated from a shadow ad campaign through one or more fields or other such logical identifiers.

Figure 6:
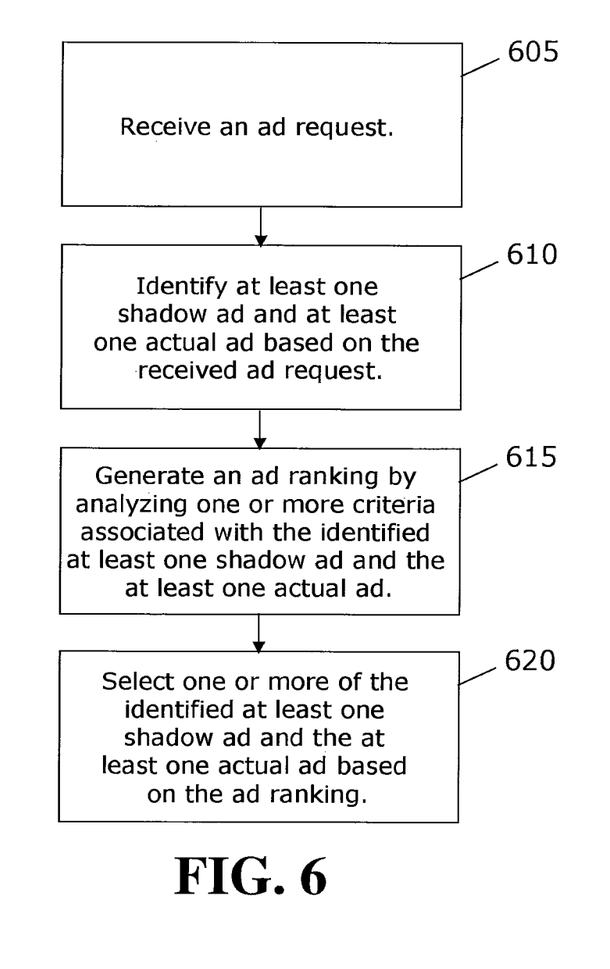
FIG. 6 shows a flow chart for evaluating a shadow ad.

FIG. 6 shows a flow chart for evaluating a shadow ad. Initially, an ad request can be received (605). At least one shadow ad and at least one actual ad can be identified based on the received ad request (610). An ad ranking can be generated by analyzing one or more criteria associated with the identified at least one shadow ad and the at least one actual ad (615). Once the ad ranking has been generated, one or more of the identified at least one shadow ad and the at least one actual ad can be selected based on the ad ranking (620).

A number of implementations have been disclosed herein. Nevertheless, it will be understood that various modifications may be made without departing from the spirit and scope of the claims. Accordingly, other implementations are within the scope of the following claims.

What is claimed is:

1. A computer-implemented method comprising:
receiving an ad request;
identifying, by an ad server, at least one shadow ad and at least one actual ad based on the received ad request, wherein an actual ad is eligible for presentation to an ad recipient while a shadow ad is selected based on the ad request but is not eligible to be presented to the ad recipient;
generating, by the ad server, a ranking of advertisements that ranks the identified shadow ad against the actual ad;
selecting, by the ad server, a highest-ranked actual ad in the ranking of advertisements for presentation to an ad recipient associated with the ad request;
providing the selected highest-ranked actual ad for presentation to the ad recipient associated with the ad request; and
determining one or more performance metrics for the shadow ad.

2. The method of claim 1, wherein generating a ranking of advertisements that ranks the identified shadow ad against the actual ad comprises conducting a shadow auction for the ad request including ranking the actual ad and the shadow ad based on actual ad campaign data associated with the actual ad and shadow ad campaign data associated with the shadow ad.

3. The method of claim 2, wherein identifying at least one shadow ad and at least one actual ad further comprises:
comparing one or more campaign parameters associated with the at least one shadow ad with one or more criteria included in the ad request to determine a match.

4. The method of claim 1, wherein determining one or more performance metrics for the shadow ad comprises determining a performance metric for the shadow ad if it were presented on a content page associated with the ad recipient.

5. The method of claim 1, wherein the generated ranking of advertisements represents a simulated display order of the actual ad and the shadow ad on a content page associated with the ad recipient.

6. The method of claim 5, further comprising:
determining that the shadow ad would be selected for display on the content page associated with the ad recipient; and
in response to determining that the shadow ad would be selected for display on the content page associated with the ad recipient, recording a charge in shadow ad campaign data associated with the shadow ad.

7. The method of claim 1, wherein the ad request is received from an online advertising system.

8. A computer program product, encoded on a computer-readable storage device, operable to cause data processing apparatus to perform operations comprising:
receiving an ad request;
identifying at least one shadow ad and at least one actual ad based on the received ad request, wherein an actual ad is eligible for presentation to an ad recipient while a shadow ad is selected based on the ad request but is not eligible to be presented to the ad recipient;
generating a ranking of advertisements that ranks the identified shadow ad against the actual ad; and
selecting a highest-ranked actual ad in the ranking of advertisements for presentation to an ad recipient associated with the ad request;
providing the selected highest-ranked actual ad for presentation to the ad recipient associated with the ad request; and
determining one or more performance metrics for the shadow ad.

9. The computer program product of claim 8, wherein generating a ranking of advertisements that ranks the identified shadow ad against the actual ad comprises conducting a shadow auction for the ad request including ranking the actual ad and the shadow ad based on actual ad campaign data associated with the actual ad and shadow ad campaign data associated with the shadow ad.

10. The computer program product of claim 9, wherein identifying at least one shadow ad and at least one actual ad further comprises:
comparing one or more campaign parameters associated with the at least one shadow ad with one or more criteria included in the ad request to determine a match.

11. The computer program product of claim 8, wherein determining one or more performance metrics for the shadow ad comprises determining a performance metric for the shadow ad if it were presented on a content page associated with the ad recipient.

12. The computer program product of claim 8, wherein the generated ranking of advertisements represents a simulated display order of the actual ad and the shadow ad on a content page associated with the ad recipient.

13. The computer program product of claim 12, wherein the operations further comprise:
determining that the shadow ad would be selected for display on the content page associated with the ad recipient; and
in response to determining that the shadow ad would be selected for display on the content page associated with the ad recipient, recording a charge in shadow ad campaign data associated with the shadow ad.

14. The computer program product of claim 8, wherein the ad request is received from an online advertising system.

15. A system comprising:
   an ad database storing at least one shadow ad and at least one actual ad; and
   a shadow ad server configured to perform operations comprising:
      receiving an ad request;
      identifying in the ad database at least one shadow ad and at least one actual ad based on the received ad request, wherein an actual ad is eligible for presentation to an ad recipient while a shadow ad is selected based on the ad request but is not eligible to be presented to the ad recipient;
      generating a ranking of advertisements that ranks the identified shadow ad against the actual ad;
      selecting a highest-ranked actual ad in the ranking of advertisements for presentation to an ad recipient associated with the ad request;
      providing the selected highest-ranked actual ad for presentation to the ad recipient associated with the ad request; and
      determining one or more performance metrics for the shadow ad.

16. The system of claim 15, wherein generating a ranking of advertisements that ranks the identified shadow ad against the actual ad comprises conducting a shadow auction for the ad request including ranking the actual ad and the shadow ad based on actual ad campaign data associated with the actual ad and shadow ad campaign data associated with the shadow ad.

17. The system of claim 16, wherein the operations comprising identifying at least one shadow ad and at least one actual ad further comprise:
   comparing one or more campaign parameters associated with the at least one shadow ad with one or more criteria included in the ad request to determine a match.

18. The system of claim 15, wherein determining one or more performance metrics for the shadow ad comprises determining a performance metric for the shadow ad if it were presented on a content page associated with the ad recipient.

19. The system of claim 15, wherein the generated ranking of advertisements represents a simulated display order of the actual ad and the shadow ad on a content page associated with the ad recipient.

20. The system of claim 19, wherein the shadow ad server is further configured to perform operations comprising:
   determining that the shadow ad would be selected for display on the content page associated with the ad recipient; and
   in response to determining that the shadow ad would be selected for display on the content page associated with the ad recipient, recording a charge in shadow ad campaign data associated with the shadow ad.

21. The system of claim 15, wherein the shadow ad server is further configured to perform operations comprising:
   receiving the ad request from an online advertising system.

22. A computer-implemented method comprising:
   maintaining a data repository comprising one or more shadow ads and one or more actual ads;
   receiving at least one ad criteria;
   retrieving from the data repository, by an ad server, at least one shadow ad and at least one actual ad where an actual ad is to be shown to an ad recipient while a shadow ad is selected based on the ad criteria but is not eligible to be presented to the ad recipient;
   generating, by the ad server, a ranking of advertisements that ranks the retrieved shadow ad against at least one actual ad based on the received ad criteria; and
   updating data corresponding to the retrieved shadow ad in accordance with the ranking.

* * * * *